United States Patent Office 3,189,742
Patented June 15, 1965

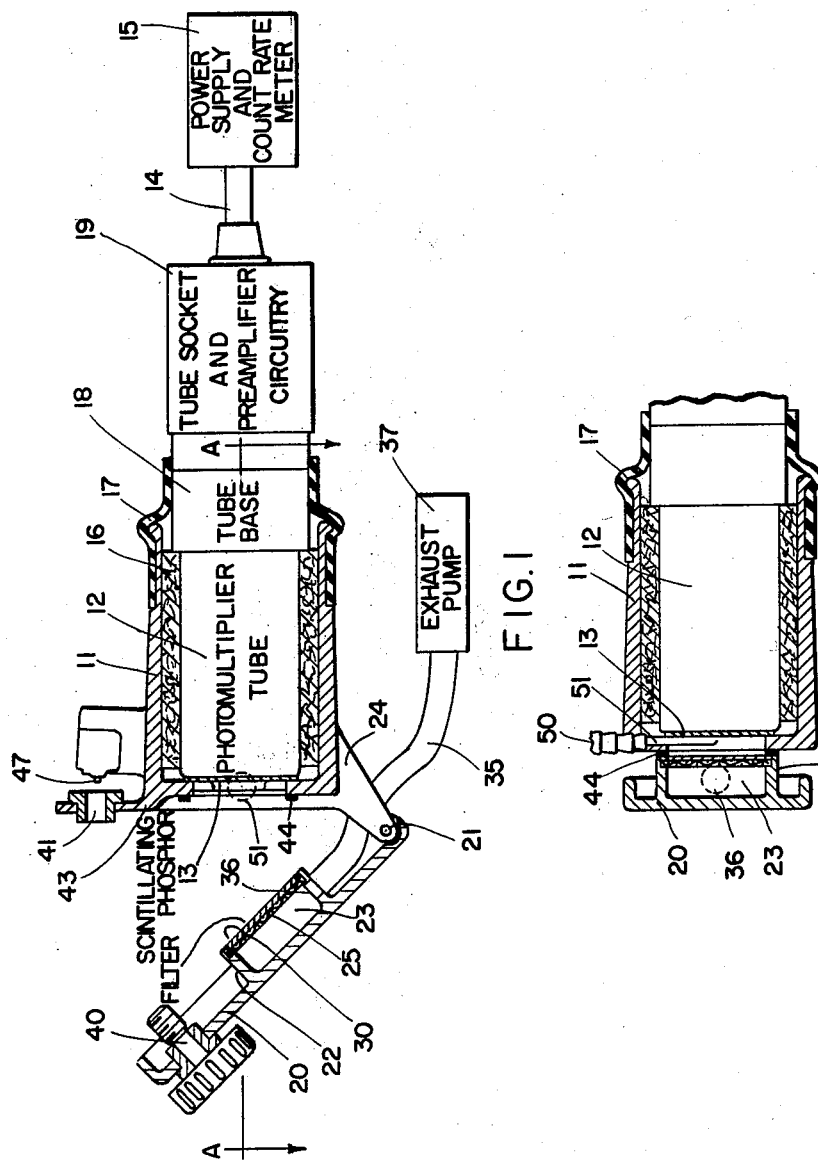

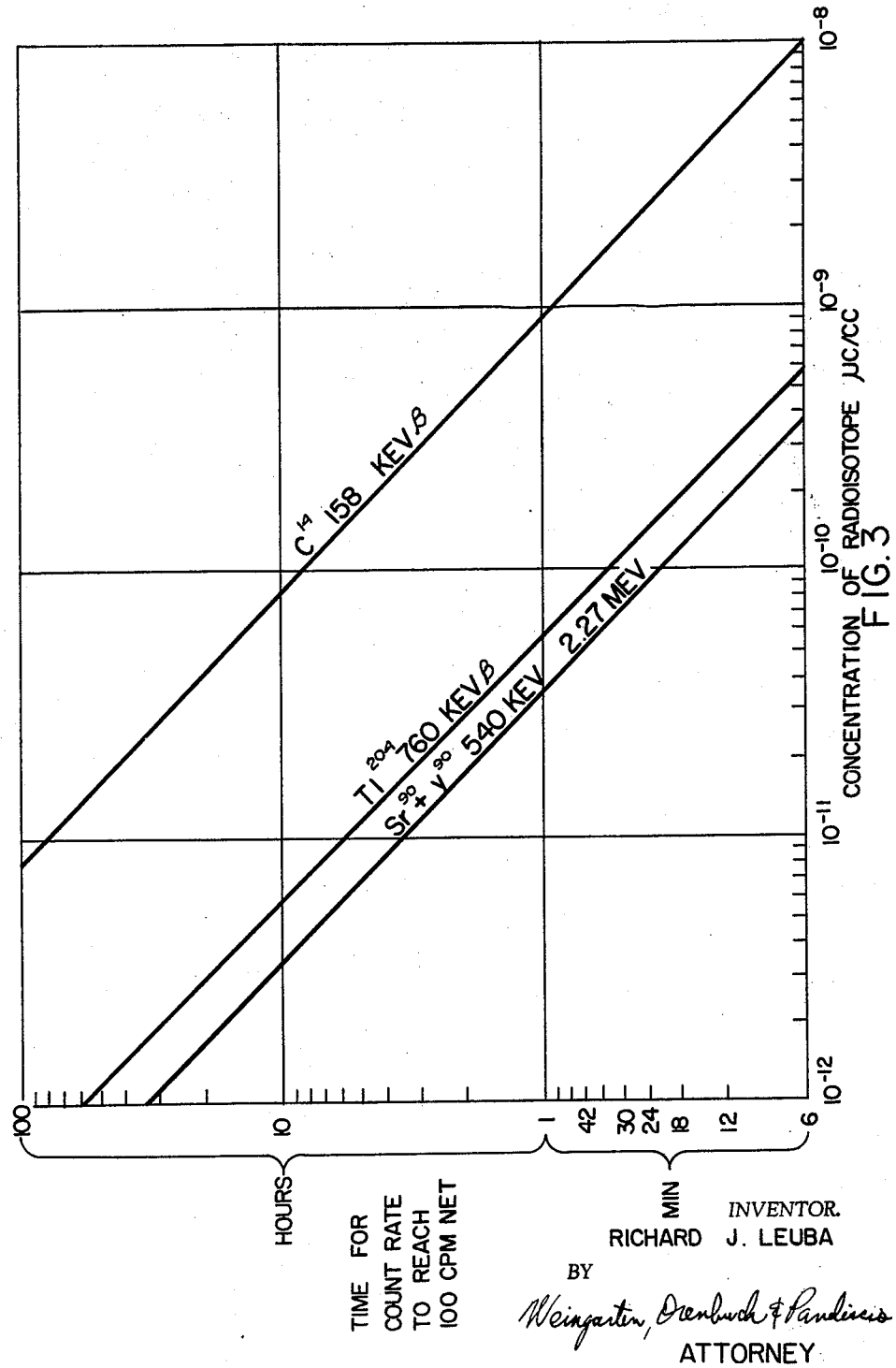

3,189,742
RADIOACTIVITY MEASUREMENT OF AIRBORNE PARTICULATE MATTER
Richard J. Leuba, Richmond, Calif., assignor to Laboratory for Electronics, Inc., Boston, Mass., a corporation of Delaware
Filed Nov. 22, 1961, Ser. No. 154,122
4 Claims. (Cl. 250—71.5)

This invention relates in general to radiation detection and, more particularly, to a portable monitor for the measurement of radioactivity of airborne particulate matter.

A monitor for determining the amount of radioactivity in airborne particulate matter is an essential safety device in many environments where radioactivity is generated or utilized. Typical environments of this nature would include radiochemical laboratories, reactor operations, uranium and fuel processing plants and nuclear test sites. Various types of monitors have been employed for this purpose, but because of the tolerance levels permissible all have included means for accumulating particulate matter for measurement by a radiation detector. While the means for accumulating the particulate matter may take the form of electrostatic precipitation, the more commonly used method is to pass the air through a fine mesh filter and then measure the radiation emitted from the particles while on the filter. While in many instances a moving strip of filter paper will be employed to accumulate the particles for measurement by the detector, the simplification of the mechanism when using a fixed filter provides advantages in terms of economics and portability for many applications.

The typical fixed filter monitor assembly consists of an air flow system for passing the air to be monitored through the filter, the filter itself, a radiation detector adapted to measure the radiation emitted from the fiter and circuitry adapted to indicate when the measured radiation from the filter exceeds a predetermined tolerance level. Monitors of this fixed filter type have been constructed. One of the problems arising in the design and construction of such monitors lies in the problem of exchanging the filters periodically. The filter must be inserted within the air flow system and, hence, in operation must provide leak tight air sealing. Additionally, a particularly suitable detector for such monitors is a scintillation detector viewing the filter, and in this case light sealing from external ambient light must also be provided. These two requirements impose relatively severe limitations on the methods of mounting and demounting the filter and, particularly so, since the handling of the filter should not be awkward in order to avoid contamination of surrounding surfaces in those instances where the filter paper has accumulated a significant degree of radioactivity.

It is, therefore, a primary object of the present invention to provide an efficient, economical fixed filter monitor for indication of the radioactivity of airborne particulate matter in which the filter element may readily be replaced.

It is another object of the present invention to provide an efficient, economical fixed filter monitor for measuring the radioactivity of particulate matter in a gaseous medium utilizing a scintillation detector and in which the filter element is adapted for ready insertion and removal.

It is still another object of the present invention to provide a fixed filter monitor for measuring the radioactivity of particulate matter in a gaseous medium wherein the filter is readily accessible from the front of the monitor and wherein the radiation detector is protected from high voltage when exposed to ambient light.

Broadly speaking, the monitor of the present invention includes a housing having an opening in one end with a hinged end piece, which is locked in the closed position for operation of the monitor and which may be swung outward from the end of the housing for insertion and removal of the filter paper. The detector assembly is included within the housing itself and consists of a photomultiplier tube with a thin, plastic scintillating phosphor integrally coupled to it. The face of the scintillating phosphor is located at the opening of the housing and is substantially parallel with this opening. The associated circuitry for connecting the output of the photomultiplier tube to a count rate meter may be any of the conventional circuitry for this purpose. The filter element, which would typically be a two-inch diameter filter paper, is mounted on a circular lip, which projects inwardly from the center of the hinged end piece. The lip thus forms a cup-like recess on the inner surface of the hinged end piece and the opening of this recess is covered with a fine wire mesh which provides mechanical support for the filter paper, while allowing flow of air or gas through it. One end of an exhaust line is connected through this lip to the interior of the recess and the other end is connected to a vacuum pump, thereby providing that in either the open or the closed position the recess in the end piece has air suction applied to it. Once the filter paper is placed on this annular lip, the suction then maintains it in this position. The housing for the detector assembly is provided with a circular flange just in front of the scintillating phosphor face which corresponds in position to the lip in the hinged end piece, and a gasket of light and air sealing material, such as rubber or neoprene is mounted on this flange. Between the flange and the face of the scintillating phosphor, an air intake tube is provided which has its orifice at a point external to the monitor itself. The surface of the annular lip on the hinged end piece is machined smoothy so that in the closed position this annular lip compresses the filter paper against the gasket which is mounted on the flange, the whole forming a light tight gas tight seal.

In operation, then, the filter paper is mounted on the annular lip with the hinged end cover open. After being positioned, the filter is held in place by the vacuum action of the pump. Upon the end cover being closed and locked in the closed position, the action of the pump draws air from the surrounding atmosphere in through the intake at the interface between the filter paper and the scintillating phosphor, through the filter paper and exhausts it through the pump. Particulate matter carried in this air is then trapped on the surface of the filter paper and the scintillation detector continuously monitors any radiation emitted from the surface of the filter paper. The filter paper has, of course, a limited useful life before it becomes clogged with particulate matter, radioactive or otherwise, from the atmosphere. When it is desired to change the filter paper, the hinged end piece is swung out and the filter paper is then readily accessible, but it will not fall out of position because of the continuing vacuum action until it is physically withdrawn from its position on the annular lip.

Other objects and advantages will become apparent from the following detailed description when taken in conjunction with the accompanying drawings in which:

FIG. 1 is a cross-sectional view from one side of a detector housing and end cover for a radiation monitor in accordance with the principles of this invention;

FIG. 2 is a partial cross-sectional view taken along the line A—A of the embodiment illustrated in FIG. 1; and FIG. 3 is a graphical illustration of the time required to reach a counting rate level of 100 counts per minute as a function of the concentration of radioisotopes in the atmosphere for three typical artificial radioisotopes.

With reference now specifically to FIG. 1, the photomultiplier tube 12 and scintillating phosphor 13 combination are shown within the detector housing 11. The scintillating phosphor is optically coupled to the tube to form a radiation detector. The photomultiplier 12 is maintained in place and cushioned within the housing 11 by packing 16, which typically would be felt. The photomultiplier tube base 18 protrudes beyond the housing 11 and is coupled snugly to it by a rubber boot 17. A tube socket 19 containing preamplifier circuitry is connected to the tube base 18 and is also connected through cable 14 to a count rate meter and power supply circuit 15. The count rate meter and power supply may be conventional circuits for this purpose, the power supply providing high voltage to the dynode structure of the photomultiplier tube and the count rate meter providing an output indication of the number of pulses per unit time received from the photomultiplier tube. The scintillating phosphor 13 may be any of the usual scintillating crystals, the choice of crystal being largely dependent upon the particular type of radiation to be measured. For example, for alpha radiation a typical crystal would be silver activated zinc sulfide, while for beta detection a thin scintillating plastic phosphor would be more suitable. In either case a thin covering such as aluminized Mylar is placed over the phosphor to protect it.

The detector housing 11 is generally cylindrical and has one open end which is adapted to be closed by a hinged cover member 20, which is shown hinged to supporting studs 24 by pivot members 21. On the inner face of the hinged cover member 20, a circular lip 22 projects inwardly toward the opening of housing 11, thereby forming a circular cup-shaped recess 23. The opening of this recess is covered by a fine mesh wire screening 25. The filter element 30 is a circular filter paper; two-inch diameter Hollingsworth & Vose, HV-70, being a suitable example. An exhaust line 35 is connected through orifice 36 to the interior of the recess 23 at one end and the other end of this exhaust line 35 is connected to a vacuum pump indicated generally at 37. A latching screw 40 on the cover 20 fits into a latch receptacle 41 on the projecting front of the housing 11 in order to lock the cover in the closed position. A circular flange 43, located just in front of the face of the scintillating phosphor 13, serves as a seating member for receiving the front edge of the circular lip 22 when the cover 20 is hinged into the closed position. A gasket member 44, formed of neoprene, is mounted on the outer face of flange 43 and provides gas and light sealing when the cover member is closed. A switch member 47 is mounted on the outer projecting surface of housing 11 such that it is actuated by the latching of the screw 40. This switch member 47 controls the application of high voltage to the photomultiplier tube 12 and thus acts as a high voltage interlock. When the latching screw 40 is disengaged, the high voltage is removed from photomultiplier tube 12 by the action of this switch.

The detector housing and cover are shown with the cover in the closed position in FIG. 2, which is a view taken along the line A—A of FIG. 1 of this portion of the embodiment shown in FIG. 1. An air intake 50, external to the monitor, is coupled through an orifice 51 in the housing 11 with the orifice 51 located intermediate the face of the scintillating phosphor 13 and the flange 43.

In operation, the filter disc 30 is placed over the circular lip 22 with the vacuum pump 37 running and the suction drawn on the filter maintains it in place once it has been positioned on the lip. With a suitable pump the pressure drop across the filter 30 is about 5 inches of mercury. The end cover 20 is then moved into the closed position and latched. The action of closing releases the high voltage interlock represented by switch 47 so that high voltage may be applied to the photomultiplier tube rendering it an active radiation detection system. In the closed position, the annular lip 22 compresses the filter 30 against the gasket 44 mounted on the flange ring 43 and, thus, a sealed chamber is formed, which includes the interior volume of housing 11 and the recess 23 in the cover. This sealed chamber has an air intake 50 and an exhaust line 35 and, hence, air is drawn into the chamber, through the filter 30, and exhausted through the vacuum pump 37. Particulate matter of appropriate size in the air so drawn is caught in the filter 30 and, when the particulate matter is radioactive, radiation from it is measured by the scintillating phosphor photomultiplier combination.

The high voltage interlock provides an essential feature of the monitor, since if the photomultiplier tube were to be exposed to ambient light with the high voltage on, the photocathode and dynode structure would become excited requiring a considerable period of time to return to stable operation.

The sensitivity of the monitor will, of course, depend upon the volumetric flow of air through the filter. A suitable pump for this purpose is one having a capacity of 2.75 cubic feet per minute at 5 inches of mercury. The sensitivity will also depend upon the particular selection of scintillating phosphor used. With a typical thin plastic detector, the graph of FIG. 3 illustrates the time required for the various concentrations of radioisotopes expressed in microcuries per cubic centimeter to build up a sufficient concentration on the filter paper for 100 counts per minute to be registered on the count rate meter. The times required for each of the three isotopes shown, that is, carbon 14, thalium 204, and strantium 90 plus yttrium 90, vary because of the energy differences of the beta particle radiation they emit.

There is, however, an equilibrium background counting rate which results from the collection of naturally occurring radioactive particles in the air. These particles are the daughters of radon and thoron, gases which result from the decay of uranium and thorium deposits in the earth's crust. Both of these gases have solid daughter products which decay by beta emission, the radon daughters being the major contributor to the background rate. The equilibrium counting rate for these naturally occurring isotopes, that is, the rate when collection equals the disintegration rate of the collected naturally occuring isotopes, may vary from 100 to 1,000 counts per minute, depending on the locale and on the particular meteorological conditions. At the pumping rates cited above, the equilibrium would normally be established within two to three hourse after commencing operation with a clean filter. The artificial isotopes, such as those illustrated in FIG. 3, have considerably longer decay half-lives than those naturally occurring products of radon and thoron and, hence, increasing the time of collection increases the sensitivity of the instrument.

While the instrument has been described, for the most part in terms of monitoring air, it is, of course, applicable to monitoring radioactive particulate matter in any gaseous medium, and the particular choice of detector will, as indicated earlier, depend upon the expected isotope contaminant.

Having thus described the invention, many modifications and departures will now occur to those skilled in this art, and the invention herein should, therefore, be construed as limited only by the spirit and scope of the appended claims.

What is claimed is:

1. Radiation measuring apparatus for indicating the radioactivity of particulate matter in a gaseous medium comprising a radiation detector having a radiation sensitive area; a housing enclosing said radiation detector, said housing having an opening at one end thereof, said radiation detector having said sensitive area exposed to said opening; a cover member hinged to said housing and adapted in one position to close said opening; a recess in said cover member with an inwardly projecting circular lip; a filter element adapted to pass said gaseous medium and to accumulate the said particulate matter on the surface thereof, said filter element being adapted to be supported on said lip, said lip being such that when said cover member is in said closed position, said filter element supported upon it is spaced apart from and close to said detector sensitive area; a flange projecting inwardly from the interior wall of said housing at said opening; a sealing element mounted on said flange member, said flange member and said sealing element being adapted to form a light-tight gas-tight seal with said lip and said filter element when said cover member is in said closed position; a gas intake inlet having an orifice external to said housing and communicating with the interior of said housing at a location intermediate said detector sensitive area and said filter element; exhaust pump means coupled to the interior of said recess for drawing said gaseous medium through said filter and exhausting said gas through said pump means; means coupled to said radiation detector and adapted to provide an indication of radiation incident upon said sensitive area.

2. Radiation measuring apparatus for indicating the radioactivity of particulate matter in a gaseous medium comprising, a radiation detector having a radiation sensitive area; a housing having a generally cylindrical interior cavity, said housing having an opening at one end thereof, said radiation detector being positioned within said cavity such that said sensitive area is exposed to said opening; a cover member hinged to said housing and adapted in one position to close said opening; a ferrule mounted on the interior surface of said cover member and projecting inwardly therefrom, thereby forming a circular recess; a circular filter element adapted to pass said gaseous medium and to accumulate said particulate matter, said filter element being adapted to be mounted on said ferrule; exhaust pump means coupled to the interior of said recess for drawing said gaseous medium through said filter element mounted on said ferrule and exhausting said gas through said pump means, said ferrule and said filter element being such that said filter is maintained in position on said ferrule by said gas flow, said ferrule being positioned on said cover member such that when said cover member is in said closed position, said filter element is spaced a small distance apart from and exposed to said detector sensitive area; seating means on said housing in the region of said opening for forming a gas-tight, light-tight seal with said filter element and said ferrule when said cover member is in said closed position; a gas intake inlet having an orifice external to said housing and communicating with the interior cavity of said housing at a location intermediate said detector sensitive area and said filter element; readout means coupled to said radiation detector and adapted to provide readout indication of the quantity of radiation incident upon said detector sensitive area.

3. Apparatus in accordance with claim 2 having a wire mesh covering the opening in said circular recess of said cover member for supporting said filter element positioned on said ferrule.

4. Apparatus in accordance with claim 1, wherein said detector comprises a photomultiplier tube and a scintillating zinc sulfide phosphor.

References Cited by the Examiner
UNITED STATES PATENTS 2,892,091  6/59  Sawle _____ 250—71.5
3,005,100  10/61  Thompson _____ 250—71.5

OTHER REFERENCES

"Rugged Scintillation-Counter Housing for Biological Applications," by L. E. Preuss, from Nucleonics, vol. 11, No. 6, June 1953, pp. 74–75.

RALPH G. NILSON, *Primary Examiner.*

ARCHIE R. BORCHELT, *Examiner.*